United States Patent [19]

Renevot

[11] Patent Number: 4,576,617

[45] Date of Patent: Mar. 18, 1986

[54] APPARATUS COMPRISING THE COMBINATION OF FILTER APPARATUS AND REGENERATION APPARATUS AND PROCESS FOR REGENERATING THE FILTER APPARATUS USING THE REGENERATION APPARATUS

[75] Inventor: Gérard Renevot, Paris, France

[73] Assignee: Regie Nationale des Usines Renault, Boulogne-Billancourt, France

[21] Appl. No.: 618,261

[22] Filed: Jun. 7, 1984

[30] Foreign Application Priority Data

Jun. 16, 1983 [FR] France ................................ 83 09951

[51] Int. Cl.[4] ........................ B01D 46/04; F01N 3/18; F01N 3/36

[52] U.S. Cl. ........................................ 55/96; 55/282; 55/DIG. 10; 55/DIG. 30; 422/178; 422/212; 60/286; 60/303; 60/311; 431/263

[58] Field of Search .................... 55/96, 282, 466, 523, 55/DIG. 10, DIG. 30; 422/178, 212; 60/286, 303, 311; 431/208, 258, 259, 263

[56] References Cited

U.S. PATENT DOCUMENTS

| | | | |
|---|---|---|---|
| 2,072,731 | 3/1937 | Crosby | 431/263 |
| 2,832,402 | 4/1958 | Jurisich | 431/263 |
| 3,653,794 | 4/1972 | Shakiba | 431/208 |
| 3,791,143 | 2/1974 | Keith et al. | 60/286 |
| 4,322,387 | 3/1982 | Virk et al. | 55/282 |
| 4,372,111 | 2/1983 | Virk et al. | 60/274 |
| 4,383,411 | 5/1983 | Riddel | 60/303 |
| 4,404,795 | 9/1983 | Oishi et al. | 60/303 |
| 4,449,362 | 5/1984 | Frankenberg et al. | 55/282 |
| 4,450,682 | 5/1984 | Sato et al. | 55/523 |

FOREIGN PATENT DOCUMENTS

| | | | |
|---|---|---|---|
| 2406440 | 8/1974 | Fed. Rep. of Germany | 60/303 |
| 2326486 | 12/1974 | Fed. Rep. of Germany | 60/303 |
| 2410644 | 9/1975 | Fed. Rep. of Germany | 60/286 |
| 2064983 | 6/1981 | United Kingdom | 55/96 |

*Primary Examiner*—David L. Lacey

*Attorney, Agent, or Firm*—Oblon, Fisher, Spivak, McClelland & Maier

[57] ABSTRACT

Apparatus and process for regeneration of clogged solid particle filters, particularly for diesel engines. There is periodically injected upstream from the clogged filter an organic liquid such as $C_xH_yO_z$, of the ethyl or methyl alcohol type, having a low vaporization temperature, if necessary with water added. The organic liquid, after having been preheated and cracked to give rise to a very flammable mixture consisting essentially of hydrogen and carbon monoxide, is introduced in the path of the incident exhaust gases. The regeneration apparatus comprises two prechambers, each of which contains a glow plug. The burning of the flammable mixture regenerates the clogged filter.

15 Claims, 8 Drawing Figures

FIG. 7
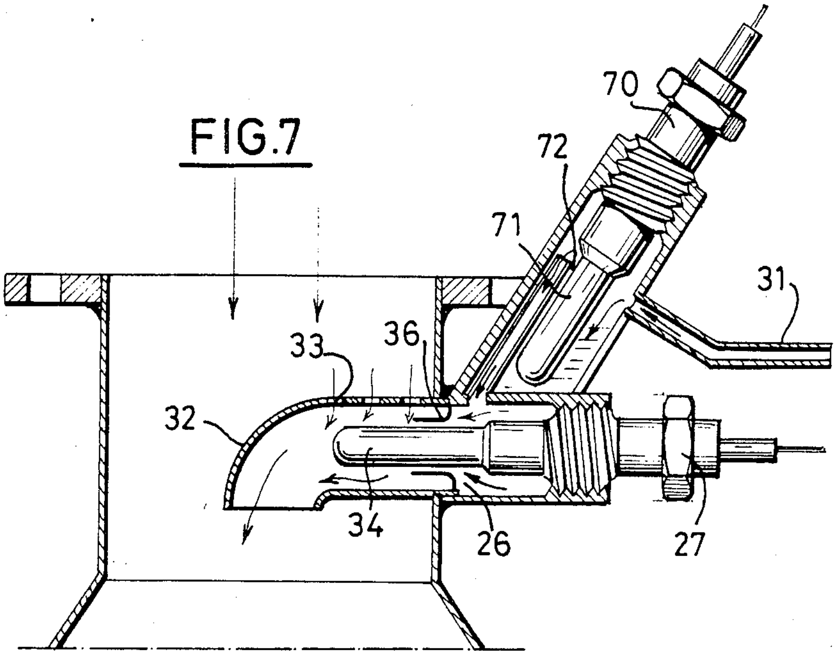
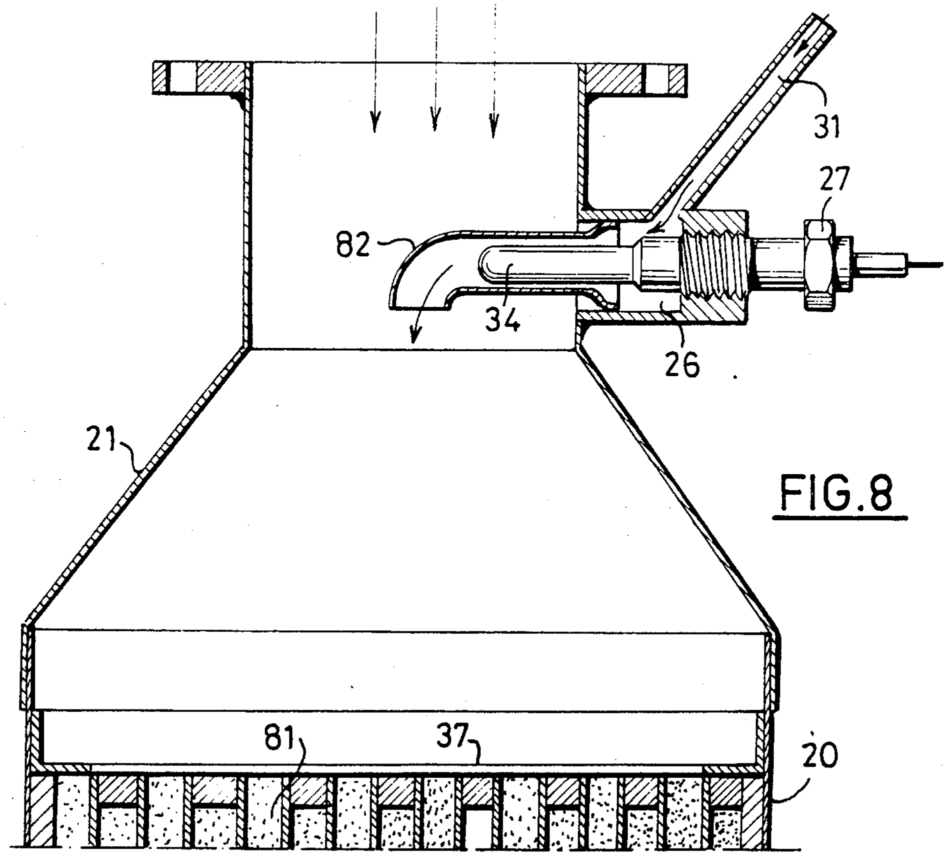
FIG. 8

APPARATUS COMPRISING THE COMBINATION OF FILTER APPARATUS AND REGENERATION APPARATUS AND PROCESS FOR REGENERATING THE FILTER APPARATUS USING THE REGENERATION APPARATUS

FIELD OF THE INVENTION

This invention relates to regeneration of solid particle filters which are intended to reduce the emission of fumes by engines.

BACKGROUND OF THE INVENTION

Solid particle filters for engines can be made of cellular ceramic such as cordierite extruded in the form of a honeycomb monolith, impregnated or not with a catalyst. Every other cell in such honeycomb monoliths is blocked at one end. The blocked ends alternate from one cell to the next contiguous cell so that the gas to be filtered cannot flow directly through a given cell, but rather is forced to go through the wall of the cell.

Other types of filters, using metal fibers, covered or not with alumina, or comprising balls, etc., are also known.

The result of the first of the above arrangements is that the solid particles in suspension in the gas arriving at the filter are trapped in the cells. The trapping of the solid particles in the cells finally clogs them, causing an increasing pressure drop across the filter and thus a significant loss of engine power.

Therefore it is periodically necessary to regenerate the filter by combustion of said trapped particles, essentially consisting of carbon, in the form of a thermal energy input sufficient to start their combustion. However, this input must be controlled. Otherwise, the combustion of the solid particles can lead to too fast a rise in the temperature of the ceramic and damage its structure by local fusion.

Let us point out that combustion of these particles begins to occur at around 550° C. in the case of a filter not impregnated with a catalyst and on the order of 450° C. in the case of a filter impregnated with a catalyst.

Regeneration devices of various types for such filters are already known.

In the case of catalytic filters, injection at a given moment of a certain amount of gas oil in one of the engine cylinders causes partial cracking of this fuel into gaseous hydrocarbons. The gaseous hydrocarbons, with the excess oxygen present in the fuel gases, burn on the catalytic surfaces, producing the amount of heat necessary to start combustion of the trapped particles.

For noncatalytic filters there are other devices such as gas oil burners whose outside combustion air intake is performed by the action of an additional pump placed in the vicinity of the container.

In the various cases cited, the drawbacks are many: momentary and bothersome disturbances of operation of the engine, risk of formation of carbon particles coming from incomplete cracking or nonignition of the fuel burner, need to have an air pump, etc.

OBJECTS OF THE INVENTION

The principal object of this invention is to reduce the above drawbacks. Oxidation of the trapped carbon particles occurs with a simplified device, normally not requiring an air injection pump. Furthermore, the simplified device is compact and integrated with the container comprising the ceramic filter.

Further, the energy input is determined by injection of an organic liquid such as methyl alcohol, which vaporizes at a low temperature (close to 70° C.), not releasing bothersome byproduct during its cracking. This gives rise to a very rich fuel gas comprising a large amount of hydrogen which is easy to ignite.

BRIEF DESCRIPTION OF THE DRAWINGS

The invention will now be described by way of nonlimiting example with reference to the accompanying figures:

FIG. 1 shows a longitudinal section of a ceramic filter used and known previously;

FIG. 2 is a skeleton diagram of the filter regeneration device according to the invention;

FIGS. 3 to 8 show, on an enlarged scale, sections of the container holding the ceramic according to six variants of the invention.

DETAILED DESCRIPTION OF THE PRESENTLY PREFERRED EMBODIMENTS

Figures 1, 2, 3:
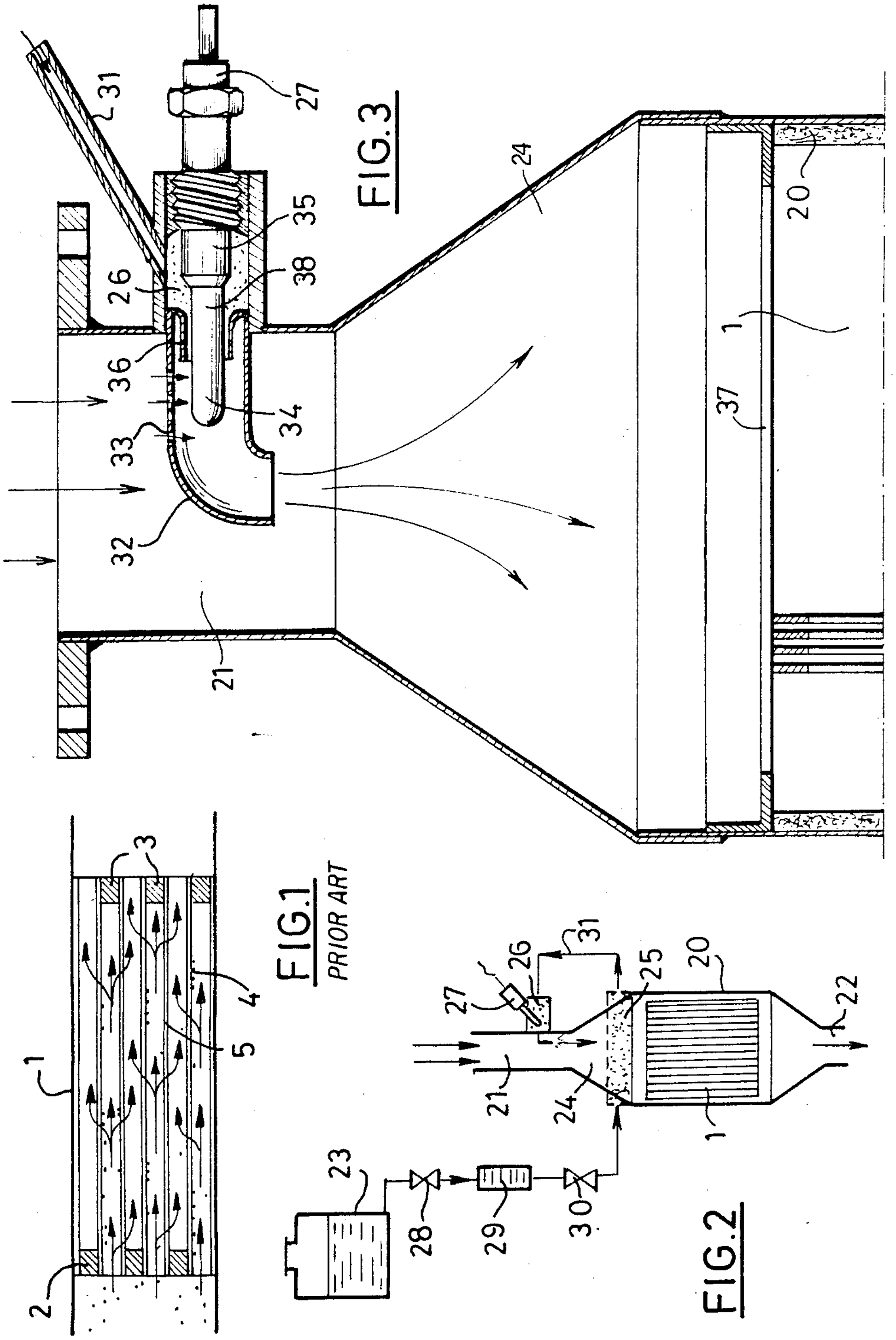
FIG.1 PRIOR ART

Filter 1 of FIG. 1 is subjected, at its left part, to the incident flow of the exhaust gas of a diesel engine. It can be seen that, on this side, only one cell out of two offers free access, the other comprising a seal 2. The right face of this filter also has seals 3 corresponding to the opposite ends of the free access cells on the left side of the filter. The arrows show in an obvious way the path of the gases through walls 5 of the cells and make it possible to grasp the clogging phenomenon of the filter resulting from accumulation of carbon particles 4 on the porous walls of the cells.

This filter 1 is in FIG. 2, included in the cylindrical part of a container 20 through which the exhaust gases travel, arriving through its upstream part 21 and leaving, purified, by its downstream part 22.

According to the invention, an organic liquid of the methyl alcohol type coming from a tank 23 is dosed, and periodically injected, in the upper zone 24 of the container. The delivery of this injection is, if necessary, modulated in time. Additionally, the organic liquid is optionally preheated and vaporized by passage at 25 in contact with container 20.

The vapors thus obtained are cracked in a prechamber 26 comprising a glow plug 27 of the diesel type that can reach 800° to 1000° C., then injected in the direction of filter 1, to which is brought the energy necessary for its regeneration, in the form of a fuel mixture of hydrogen and carbon monoxide.

$$CH_3OH \rightarrow CO + 2H_2$$

If filter 1 is not catalytic, the preceding mixture is ignited on contact with the glow plug 27 and raises the temperature of the filter and its carbon particles 4. The carbon particles 4 accordingly oxidize to $CO_2$ and go through walls 5.

If filter 1 has been impregnated with a catalytic phase (preferably with a base of platinum or palladium), the cracking gas burns only at the catalytic support 1 itself and thus causes combustion of the carbon particles. In this case, the temperature of the start of combustion of the soots is notably less than that of the preceding case and is on the order of 450° C.

Other organic liquids of the $C_xH_yO_z$ can be used according to the above. Preferably a liquid will be chosen which has a rather low vaporization temperature, such as ethyl alcohol, if necessary glycol, or again glycerin, or their mixture giving a stable gaseous mixture. This list is not limiting.

It is also possible to use stable mixtures of the above liquids with water, according to the following formula: 1 mole of ethyl alcohol + 1 mole of water $$C_2H_5OH + H_2O \rightarrow C_2H_8O_2$$

$$C_2H_8O_2 \rightarrow 2CO + 4H_2$$

An effort will be made to see that the organic liquid used has an equal number of carbon and oxygen molecules to avoid formation of free carbon during cracking, or to have a cracking atmosphere containing a high percentage of methane which can be the origin of a carbon deposit as, for example, propyl alcohol:

$$C_3H_7OH \rightarrow CO + 2CH_4$$

$$CH_4 \rightarrow 2H_2 + C$$

The desired gas mixture is very flammable, consisting essentially of carbon monoxide (33%) and hydrogen (66%).

Triggering of the filter regeneration operation follows detection of clogging of the filter and can be made automatic. It can, for instance, result from supplying of an electric signal which comes from the contact made between two electrodes in the ceramics which are originally insulating but made conductive by the accumulation of carbon particles. Alternatively, triggering of the filter regeneration operation can come from measurement of an excess pressure in the enclosure of container 20 for a given engine speed. Still further, the filter regeneration operation can be triggered by the counting of a determined number of revolutions of the engine.

When the regeneration threshold is reached, an opening signal comes to solenoid valve 28, which governs filling of chamber 29 which corresponds to the volume of organic liquid necessary for regeneration of the filter. Then, closing of solenoid valve 28 and opening of solenoid valve 30 are ordered, causing the introduction by gravity of the organic liquid by line 31 into prechamber 26 in which glow plug 27 simultaneously has voltage applied to it by any known means.

The organic liquid because of the calories picked up on contact with exhaust wall at 25 and under the influence of plug 27, is transformed, after cracking, into a gas having a high calorific value which, by burning, causes the combustion of the carbon particles trapped in filter 1 during idling of the engine.

The organic liquid can also be dosed by means of a small delayed electrically controlled impeller pump, then driven through a calibrated opening, or any other equivalent means.

By way of example, good results are obtained by injecting, under the conditions of the invention, a volume of 35 cc of methyl alcohol in 90 seconds, raising the temperature of the gases to about 650° C. at the filter input and 350° C. at its output. This regeneration can be repeated with a periodicity of about 300 kilometers.

According to the embodiment of FIG. 3, filter 1, located in the cylindrical part of container 20, is at the upstream part 21 from which the exhaust gases come.

The organic liquid comes by line 31 to prechamber 26 containing glow plug 27. The free end of the glow plug 27 comes out on the inside of the upstream part 21 of container 20, in a burner body 32 curved toward filter 1 and exhibiting, on its opposite face, openings 33 through which a flow of exhaust gas goes. The dynamic pressure of the exhaust gas assures a good mixing of the cracking gases coming from prechamber 26 and oxygen contained in the exhaust gases at the hottest end 34 of the plug, which causes their combustion. The inside diameter of burner 32 is on the order of three times that of end 34 of the glow plug 27 which it surrounds.

The liquid or its vapor phase encounters a medium-temperature (500° C.) vaporation zone, located in the vicinity of the glow part 35 of plug 27 preceding its reduction in diameter.

The vapor of the organic liquid then goes through a high-temperature cracking zone represented by part 38, having a small diameter, of the glow plug 27. Adjacent part 38 the organic fluid is brought to about 1000° C. An extension of the front part 36 of prechamber 26 surrounds the glow plug 21 at a slight distance close to 1 mm over a length close to one third of that of the active part of the glow plug 27.

The cracked gases then reach a hot spot, constituted by end 34 of the glow plug 27, where they are mixed with the exhaust gases and ignited, thus constituting the calorific input necessary for oxidation of carbon particles 4 trapped in filter 1. The filter surface is located at a distance from burner body 32 that is close to the diameter of the filter 1.

Since the burner has to endure relatively harsh operating conditions, it is made of stainless steel, refractory material, or ceramic material.

To avoid overheating of filter 1, the intake of the organic liquid and/or feed of the glow plug 27 can be controlled by a thermocouple governing the stopping of the operation of the device for temperatures exceeding a control point, for example, 800° C.

Figure 4:
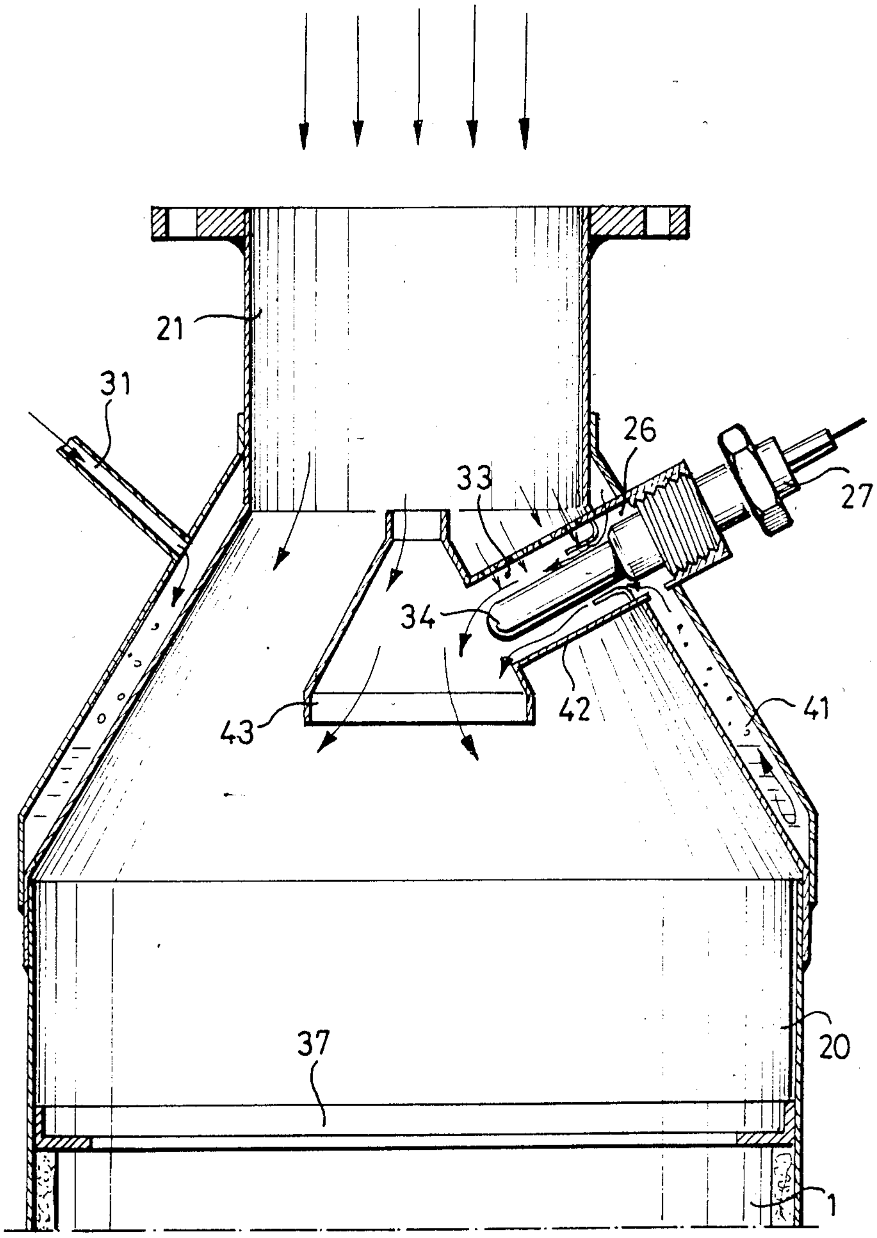
Figure 5:
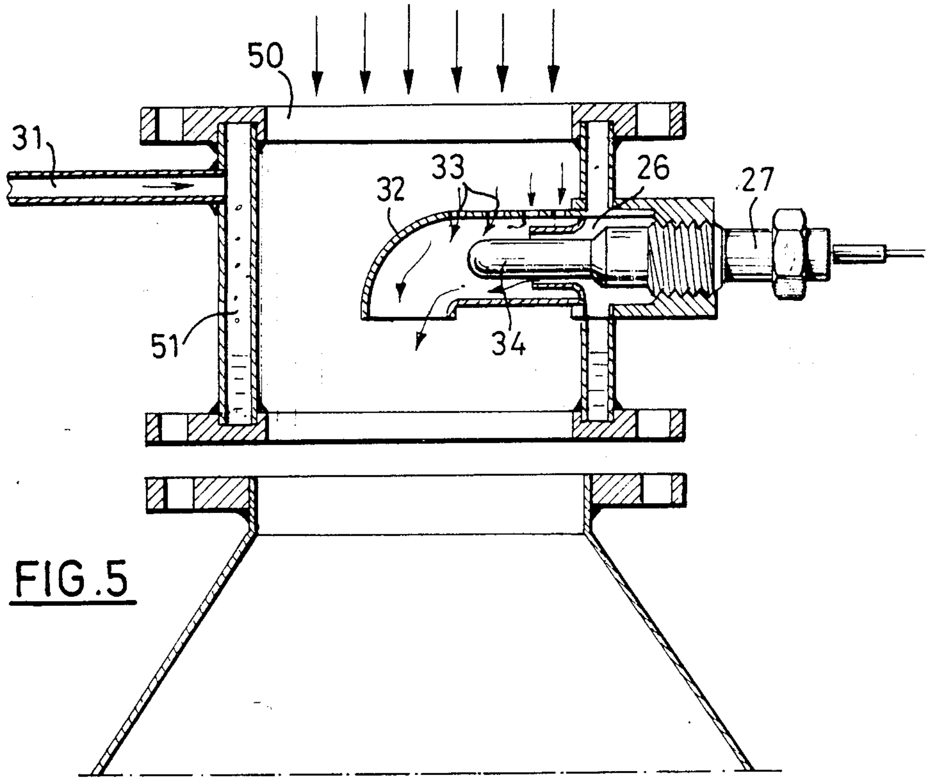

According to variants of the invention shown in FIGS. 4 and 5, it can be seen that the organic liquid, brought by line 31, comes into a casing 41, 51 with two walls. The casings 41, 51 constitute the zone for vaporization of the liquid and, to do this, use the calories available on the surface of container 20.

There will also be noted in FIG. 4 the particular shape of free end 43 of burner 42, further improving the diffusion of the gases to the surface 37 of the filter.

Figure 6:
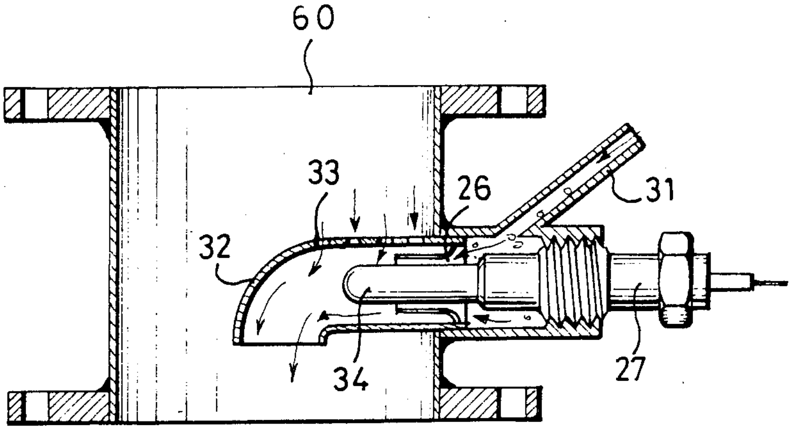

The variants of FIGS. 5 and 6 indicate the possibility according to the invention of placing the unit for vaporization, cracking and mixing of the gases coming from the organic liquid on an element 50, 60 which is independent in regard to container 20. This construction makes it possible to change filter 1 in case of need and improves the distribution of the calories on the filter surface.

According to the device of FIG. 7, vaporization of the organic liquid arriving by line 31 is performed by a second glow plug 70 brought to a temperature of 500° C. whose tip 71 projects into a second prechamber 72 in which the organic liquid is accumulated and which is open at its upper part to allow evacuation of the resulting vapors. These latter then come in contact with the first glow plug 27 brought to a higher temperature and placed in the first prechamber 26 where cracking of the gas occurs. This arrangement makes possible the regeneration of filter 1 when the vehicle starts or is idling, even when the surface of container 20 is not yet at the temperature allowing vaporization of the liquid.

In the variant of FIG. 8, filter 81 comprises, in contrast with those shown above, a catalytic phase, preferably with a base of a platinum or palladium type metal. In this case, the cracking gases do not burn directly in the burner, in contrast with the preceding examples, because they are not in contact with the additional oxygen at hot spot 34 of plug 27. Actually, the absence of openings in the upper part of nozzle 82 will be noted.

The mixture of cracked gases and oxygen of the exhaust gases occurs later, at filter 81. At this spot, oxidation occurs by inducing, over the entire catalytic surface, the increase in temperature (about 450° C.) necessary to start combustion of the trapped carbon particles.

It will be noted that in this embodiment, nozzle 82 is constituted by the extension of the front part 36 of prechamber 26. In this case, the prechamber 26 is larger than the glow plug 27, and the prechamber 26 comes out in the upstream part 21 of container 20.

Let us further note the possibility of introducing, in the device of the invention, additional air by means of an additional air pump. Such an additional air pump will allow automatic regeneration when the engine is stopped, even in the absence of the driver.

I claim:

1. Apparatus for regenerating a clogged particle filter into which exhaust gas containing carbon particles from a hydrocarborn engine is introduced by way of a conduit in fluid communication with the particle filter, said apparatus comprising:

(a) a tank for containing an organic liquid;

(b) a first prechamber in which the organic liquid is cracked;

(c) a first fluid passageway in fluid communication with said tank and with said first prechamber;

(d) a first glow plug disposed in said first prechamber;

(e) a second prechamber located in said first fluid passageway between said tank and said first prechamber;

(f) a second glow plug disposed in said second prechamber; and (g) a second fluid passageway in fluid communication with said first prechamber and adapted to be placed in communication with the conduit.

2. Apparatus as recited in claim 1 and further comprising means for metering the flow of an organic liquid through said first fluid passageway to supply predetermined doses of the organic liquid to said first prechamber when regeneration of the particle filter is desired.

3. Apparatus as recited in claim 2 wherein said means for metering the flow of an organic liquid through said first fluid passageway comprise:

(a) a chamber located in said first fluid passageway the volume of which corresponds to the volume of the organic liquid necessary for regenerating the particle filter and (b) a valve in said first fluid passageway which permits the organic liquid to flow into said chamber until it is full.

4. Apparatus as recited in claim 1 wherein said second fluid passageway comprises a burner body which extends outwardly from said second glow plug and has at least one opening in its upstream surface which permits exhaust gas to flow into said burner body, whereby the exhaust gas mixes with the hydrogen and carbon monoxide in said burner body.

5. Apparatus as recited in claim 4 wherein said first glow plug extends into said burner body.

6. Apparatus for filtering carbon particles out of the exhaust gas of a hydrocarbon engine, said apparatus comprising:

(a) a particle filter device;

(b) a conduit in fluid communication with said particle filter device;

(c) a tank for containing an organic liquid;

(d) a first prechamber in which the organic liquid is cracked;

(e) a first fluid passageway in fluid communication with said tank and with said first prechamber;

(f) a first glow plug disposed in said first prechamber;

(g) a second prechamber located in said first fluid passageway between said tank and said first prechamber;

(h) a second glow plug disposed in said second prechamber; and (i) a second fluid passageway in fluid communication with said first prechamber and with said conduit.

7. Apparatus as recited in claim 6 wherein said first fluid passageway is in thermal contact with said conduit.

8. Apparatus as recited in claim 6 and further comprising means for metering the flow of an organic liquid through said first fluid passageway to supply a predetermined dose of the organic liquid to said first prechamber when regeneration of said particle filter device is desired.

9. Apparatus as recited in claim 8 wherein said means for metering the flow of an organic liquid through said first fluid passageway comprise:

a chamber located in said first fluid passageway the volume of which corresponds to the volume of the organic liquid necessary for regenerating said particle filter device and (b) a valve in said first fluid passageway which permits the organic fluid to flow into said chamber until it is full.

10. Apparatus as recited in claim 6 wherein said second fluid passageway comprises a burner body extending into said conduit and having at least one opening in its upstream surface which permits exhaust gas to flow into said burner body, whereby the exhaust gas mixes with the hydrogen and carbon monoxide in said burner body.

11. Apparatus as recited in claim 10 wherein said first glow plug extends into said burner body.

12. A method of regenerating a clogged particle filter into which exhaust gas containing carbon particles from a hydrocarbon engine is introduced by way of a conduit in fluid communication with the filter, said method comprising the steps of:

(a) cracking an organic fluid having the formula $C_xH_yO_z$, wherein x, y, and z are positive integers, to obtain a mixture of hydrogen and carbon monoxide;

(b) heating the mixture of hydrogen and carbon monoxide to a temperature at which it will cause combustion of the exhaust gas;

(c) mixing the mixture of hydrogen and carbon monoxide with the exhaust gas at a point in the conduit between the engine and the filter, thereby causing combustion of the exhaust gas; and (d) causing the combusted exhaust gas to flow through the particle filter so as to burn off the carbon particles clogging the filter, thereby regenerating the clogged particle filter.

13. A method as recited in claim 12 wherein the heating and mixing step take place in a burner body which extends into the conduit, the burner body having at least one opening in its upstream surface which permits exhaust gas to flow into said burner body.

14. A method as recited in claim 12 and comprising the further step of preheating the organic fluid before it is cracked.

15. A method as recited in claim 12 and comprising the further step of metering the flow of the organic fluid to the cracking step to supply predetermined doses of the organic fluid to the cracking step when regeneration of the filter is desired.

* * * * *